Figure 1:
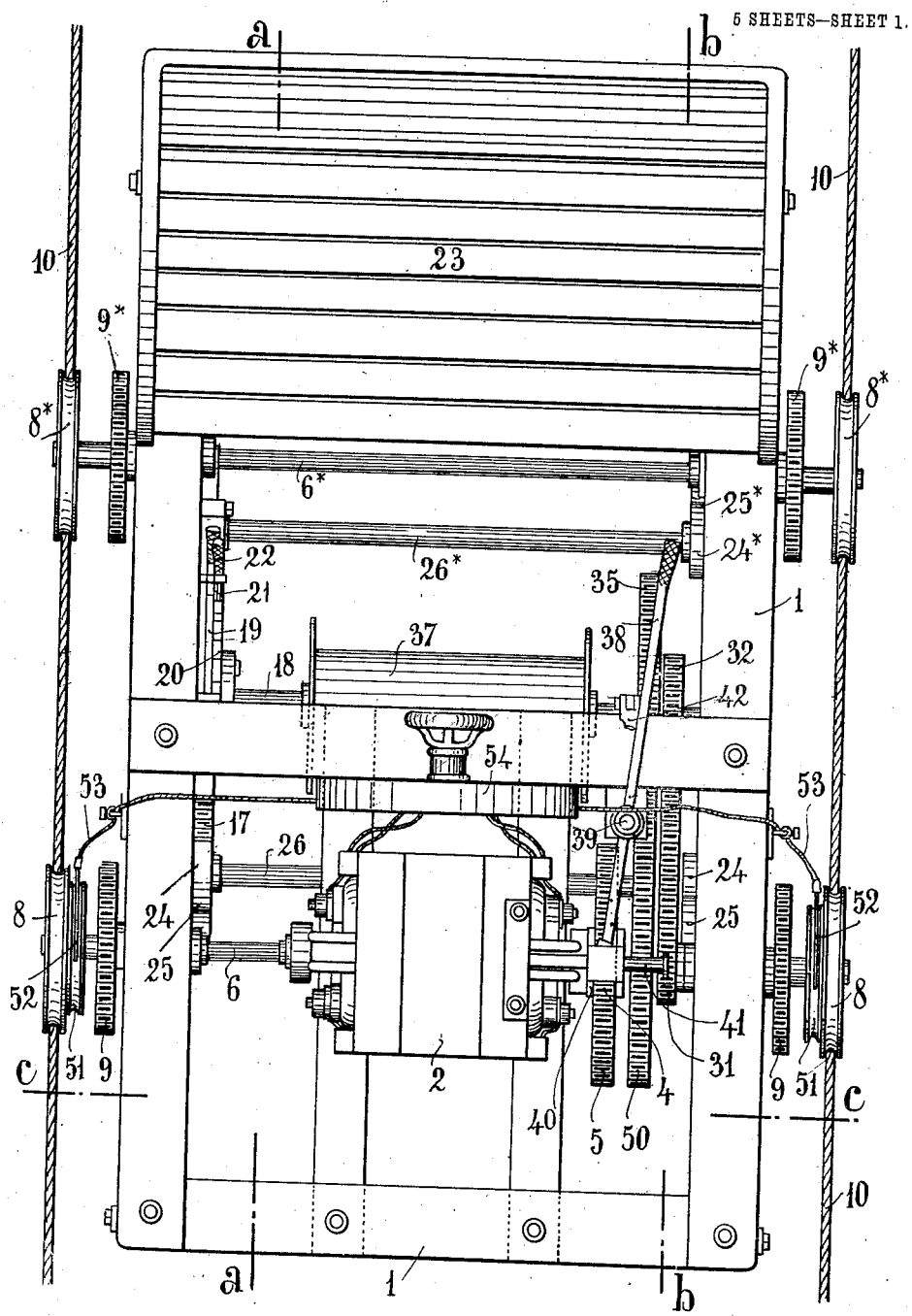

No. 830,491. PATENTED SEPT. 11, 1906.
H. BOZZALLA.
SUSPENSION CABLEWAY SYSTEM.
APPLICATION FILED NOV. 24, 1905.

5 SHEETS—SHEET 1.

WITNESSES
Ea Panabaker
H A Totten

INVENTOR
Hermenegildo Bozzalla
By Knight Bros,
ATTYS

No. 830,491. PATENTED SEPT. 11, 1906.
H. BOZZALLA.
SUSPENSION CABLEWAY SYSTEM.
APPLICATION FILED NOV. 24, 1905.
5 SHEETS—SHEET 2.
Fig. 2
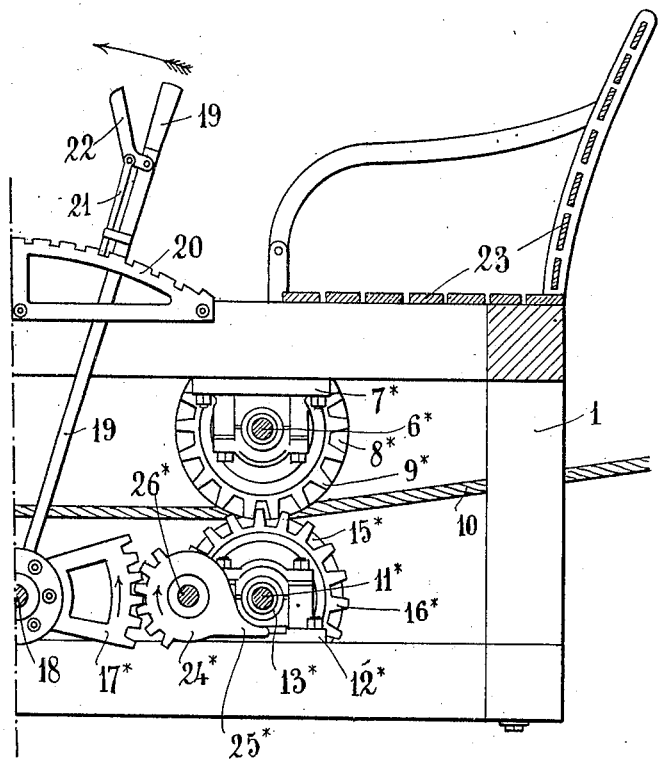
Fig. 2ª
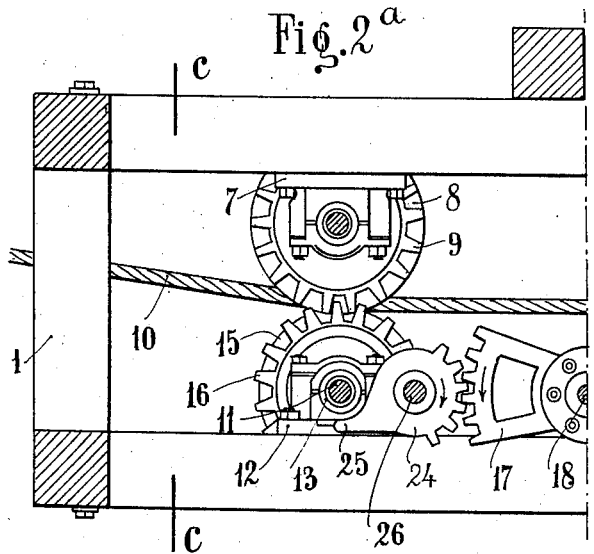
Fig. 5
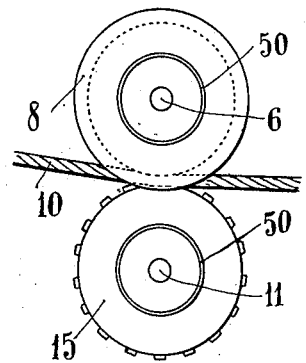
WITNESSES:
EaPanabaker.
H. A. Zitten.
INVENTOR
Hermenegildo Bozzalla
By Knight Bros
ATT'YS.

No. 830,491. PATENTED SEPT. 11, 1906.
H. BOZZALLA.
SUSPENSION CABLEWAY SYSTEM.
APPLICATION FILED NOV. 24, 1905.
5 SHEETS—SHEET 3.
Fig. 3
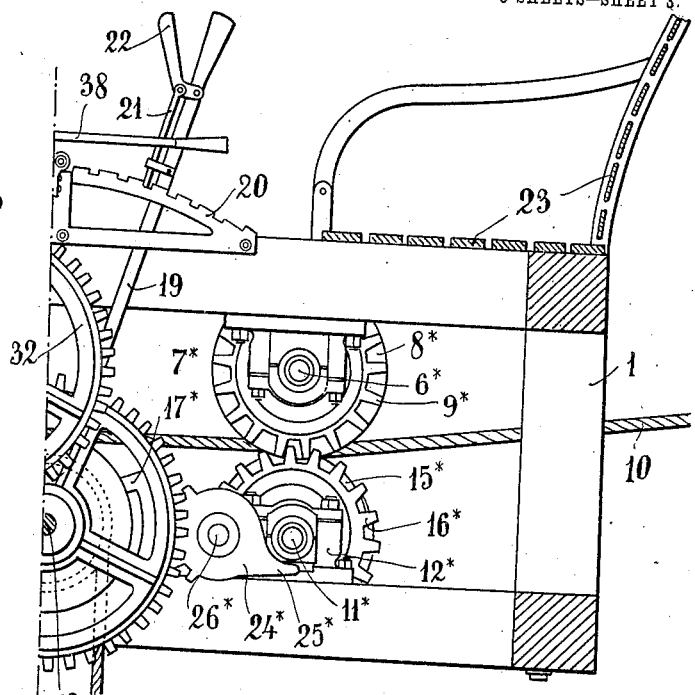
Fig. 3ᵃ
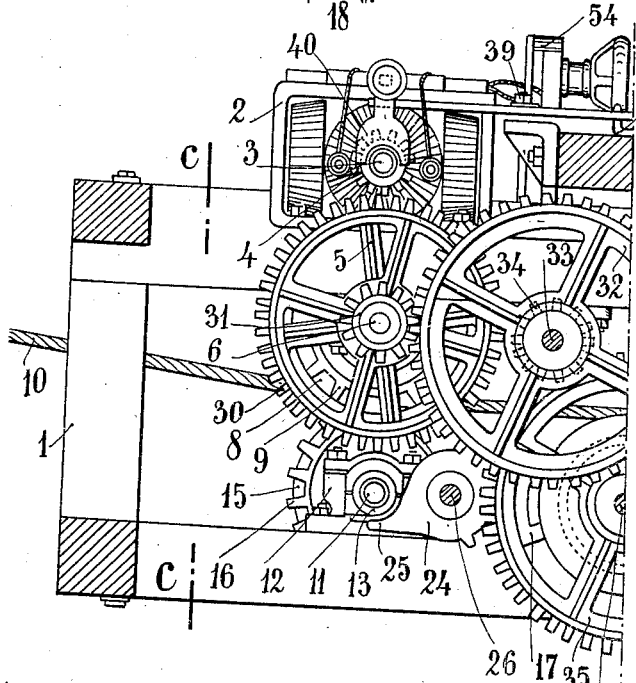
WITNESSES
Ea Panabaker.
H A Totten
INVENTOR
Hermenegildo Bozzalla
By Knight Bros.
ATT'YS No. 830,491. PATENTED SEPT. 11, 1906.
H. BOZZALLA.
SUSPENSION CABLEWAY SYSTEM.
APPLICATION FILED NOV. 24, 1905.
5 SHEETS—SHEET 4.
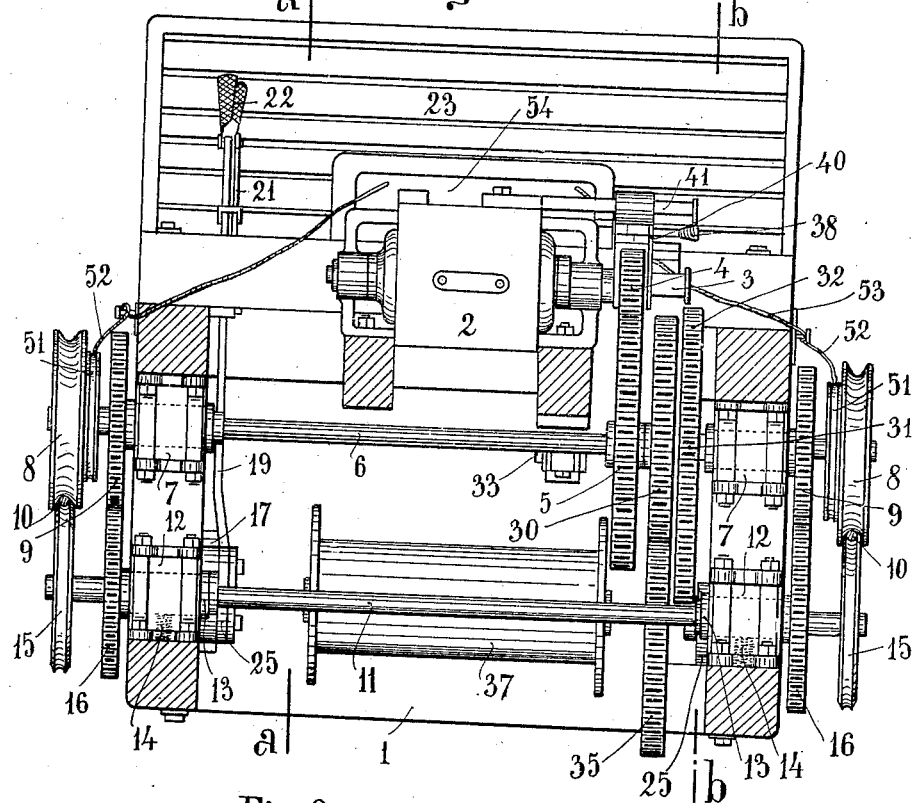
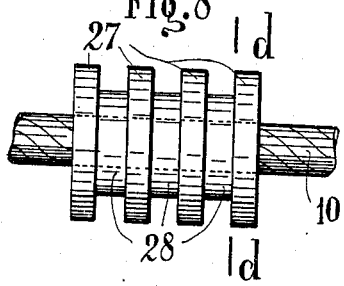
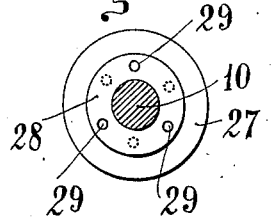
WITNESSES
EaPanabaker.
H.C. Totten
INVENTOR
Hermengildo Bozzalla
By Knight Bros.
ATTYS.

No. 830,491. PATENTED SEPT. 11, 1906.
H. BOZZALLA.
SUSPENSION CABLEWAY SYSTEM.
APPLICATION FILED NOV. 24, 1905.
5 SHEETS—SHEET 5.
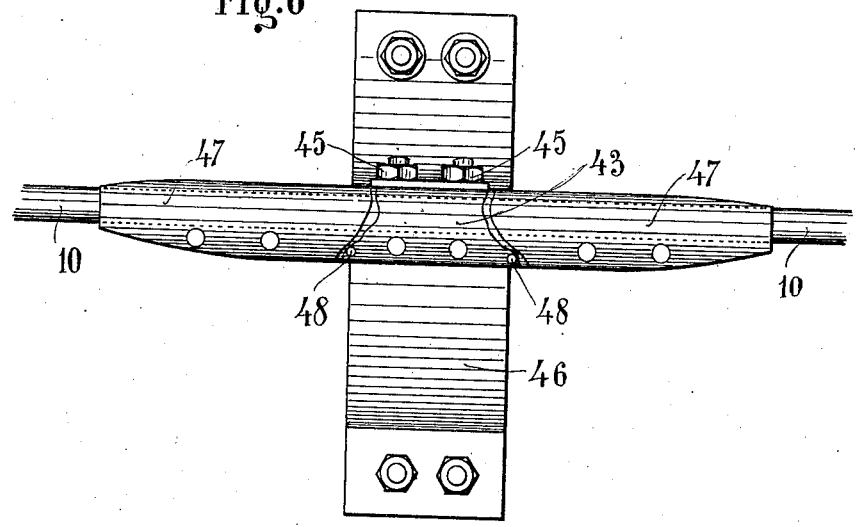
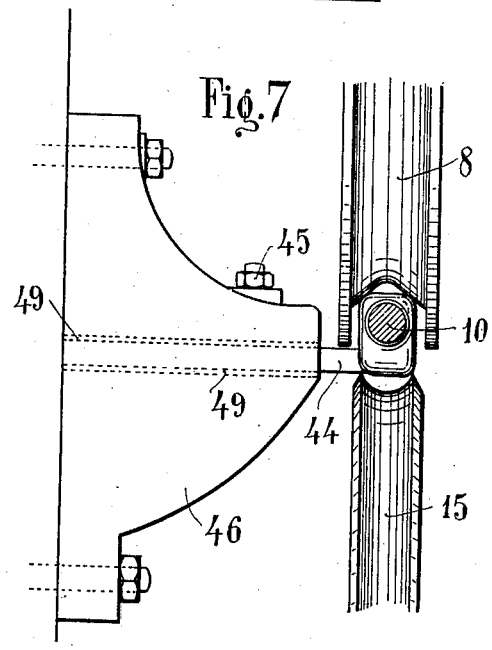
WITNESSES
EaPanabaker.
H. C. Zotter.
INVENTOR
Hermenegildo Bozzalla
By Knight Bros
ATTYS

UNITED STATES PATENT OFFICE.

HERMENEGILDO BOZZALLA, OF TORINO, ITALY.

SUSPENSION CABLEWAY SYSTEM.

No. 830,491.           Specification of Letters Patent.           Patented Sept. 11, 1906.

Application filed November 24, 1905. Serial No. 288,973.

*To all whom it may concern:*

Be it known that I, HERMENEGILDO BOZZALLA, a subject of the King of Italy, and a resident of Torino, Italy, have invented certain new and useful Improvements in Suspension Cableway Systems, of which the following is a specification.

The present invention relates to suspension cableway systems. It is customary in such devices to have an endless supporting-cable moving by means of a motor which generally is placed at one end of the track along which the cable is supported by means of pulleys. The cable is moved in the other direction by means of a return-station placed at the other end of the track, and the cars carrying the load are secured to the cable, so as to move on the track and with the cable.

In the present invention the car moves on two fixed metallic cables which merely serve the purpose of supporting the car, and a motor is mounted on the car and furnishes the necessary energy for moving the car with its load along the track.

One embodiment of the invention is shown in the accompanying drawings by way of example.

Figure 1 is a plan view of the car. Fig. 2 is a longitudinal section through one-half of the car on line *a a*, Fig. 1. Fig. 2ᵃ is a longitudinal section through the other end of the car on line *a a*, Fig. 1. Fig. 3 is a longitudinal section through one end of the car on line *b b*, Fig. 1. Fig. 3ᵃ is a longitudinal section through the other end of the car on line *b b*, Fig. 1. Fig. 4 is a transverse section on line *c c*, Fig. 1. Fig. 5 is a detail view showing the pulleys supporting the car. Fig. 6 is a front view of one of the fixed supports for the cable. Fig. 7 is a side view showing the fixed support and a part of the supporting-pulleys in the moment they pass over the support. Fig. 8 is a side view of a slightly-different form of cable; and Fig. 9 is a section on line *d d*, Fig. 8.

1 is the frame of the car, made from wood or other suitable material and supporting the motor 2, which in the embodiment shown in the drawings is an electric motor that receives the current through the supporting-cables from a generator-station placed at one end of the track.

From the armature-shaft 3 of the motor motion is transmitted to the axle 6 by means of gears 4 and 5, the axle being mounted in bearing-boxes 7. To each side of the frame 1 a pinion 9 and a grooved pulley 8 are secured on the axle 6, the pulleys supporting the car on the cables 10. A shaft 11 is located parallel to the shaft 6 and mounted in bearing-boxes 12. From the axle 6 motion is transmitted to the shaft 11 by means of the pinions 9, before mentioned, and pinions 16, secured on the shaft 11. The shaft 11 is capable of vertical displacement through the medium of mechanism which will be described later on, the journal-boxes 13 being vertically movable within the bearing-boxes 12. On the ends of the shaft 11 are secured grooved pulleys 15, and when the shaft 11 is elevated and held in this position by means of springs 14 (indicated in Fig. 4) the pulleys 15 are forced against the pulleys 8. The groove of the pulleys 8 is somewhat wider than the pulley 15, Fig. 7, so as to permit the latter to pass into the groove of the pulley 8 to securely retain the cable in the two grooves.

On the rear of the car is arranged mechanism for supporting and driving the car, which mechanism is similar to that just described and arranged on the front of the car. The rear mechanism comprises an axle 6*, to which motion may be imparted from the axle 6 by means of any suitable transmission-gear. (Not shown.) The axle 6* carries grooved supporting-pulleys 8* and pinions 9*, which by means of the pinions 16* transmit motion from the axle 6* to the shaft 11*, the latter being provided with the same members as is the shaft 11.

In order to overcome the force of gravity, it may be necessary to increase the friction between the grooves 8 15, 8* 15* and the cables 10, the friction being partially assured by means of the springs 14 14*, and for this purpose I provide an arrangement which is shown in detail in Fig. 2. This arrangement comprises a double-toothed sector 17 17*, loosely mounted on the shaft 18 and capable of being operated by means of an ordinary controlling-lever 19, having securing means 20 21 22. The sector engages with two toothed disks 24 24*, secured on shafts 26 26* and provided with arms 25 25* at the side opposite the sectors. At the other side of the car similar disks are provided on the shafts 26 26*, (see Fig. 1,) which disks have merely arms, but no teeth. The intermediate position, Fig. 2, of the lever 19 corresponds to the inactive position of the clamping device. When the lever is moved in the direction of the arrow, Fig. 2, the sectors and the disks turn, as indicated by the arrows, and the arms 25 elevate the journal-boxes 13 of the shaft 11 and force the corresponding pair of grooved pulleys 15 against the cables, and the amount of frictional force may be regulated at will by means of the lever 19. At the same time the pair of pulleys 15* are disengaged from the cables. When the lever is moved in the opposite direction, the pulleys 15* are brought into and the pulleys 15 are brought out of engagement with the cables. The operator is therefore at liberty to effect frictional engagement at either end of the car at will, but only at one end at the time, which in practice has been proved to be sufficient for assuring the necessary friction for overcoming the force of gravity. If the clamping of the pulleys were effected simultaneously at both ends of the car, there would be too much energy lost when the car passed over the supports of the tracks, as the pulleys necessarily must separate at that moment, as illustrated in Fig. 7. If a very great force of gravity has to be overcome, it is advisable to construct the supporting-cables as illustrated in Figs. 8 and 9, in which disks of varying diameter are mounted on the cables and secured to one another by means of small keepers 29. The pulleys must in this instance be replaced by toothed wheels engaging with the disk of the cables 10.

On the car is further mounted a windlass for the load. The windlass is driven by the motor of the car, and for this purpose the pinion 4 is keyed to the shaft 3 so as to be capable of being slid axially into engagement with the toothed wheel 30, Figs. 3 and 4, which is loosely mounted on the shaft 6 and has secured thereto a pinion 31, engaging with a toothed wheel 32, mounted on the shaft 33. On the shaft 33 is secured a pinion 34, which engages with the toothed wheel 35, secured on the shaft 18 of the drum 37 of the windlass. The pinion 4 is shifted through the medium of a lever 38, Fig. 1, pivoted at 39 and provided with a fork 40, embracing the pinion 4 and guided by a rod 41. An adjustable stop 42 serves for securing the lever 38 in position. A seat 23 is provided for the conductor, who operates the motor, the clamping device, and the windlass.

One of the supports for the cables is shown in Figs. 6 and 7. The support comprises a central fixed sleeve 43, receiving the cable or the meeting ends of two cable-sections and secured to a rod 44, which by means of bolts 45 is secured to a bracket 46, fixed on one of the poles of the cableway. 47 represents two lateral sleeves, which are hinged at 48 to the central sleeve and provide for a flexible connection between the cable and the central sleeve. This arrangement makes the passage of the pulleys 8 15 and 8* 15* over the supports more smooth and at the same time permits of the cable bending freely at the side of the support when the car approaches, and the weight of the car tends to increase the curvature already existing on the cableway.

The cables 10 are utilized for conducting the current to the motor, and in order to provide for insulation between the two cables and between the cables and the earth the rod 44 is insulated in the bracket 46 by means of an envelop 49 of vulcanized fiber or the like. Moreover, the pulleys 8 15 and 8* 15* are composed of an exterior crown of conductive material and a core, insulated from one another by means of a ring 50 of insulating material. A conductive disk 51 is secured to the crown of each of the front pulleys 8 of the car and insulated from the other parts of the car. The disks 51 contact with brushes 52, which take up the current, the brushes being connected to the controller 54 by means of wires 53 and the controller being electrically connected to the motor 2.

I wish it to be understood that various minor changes may be made in the construction of the cableway system without departing from the scope of the invention. A special line for conducting the current and independent of the supporting-cables might be employed, and any suitable motor, such as an explosion-motor, may be substituted for the electric motor, in which case the transmission-gear and the controlling-gear may be varied to suit the form of motor used.

Having described my invention, what I claim as new is—

1. In a suspension cableway system, a pair of fixed cables, a car having traveling connection with the cables at both ends, and means for clamping the cables to the traveling connections of the car; said means being constructed to break the clamping connection at one end of the car when the other end of the car is clamped to the cables.

2. In a suspension cableway system, a support for the cable comprising a fixed central sleeve through which the cable passes, and a pair of additional sleeves receiving the cable and having flexible connection with the central sleeve.

3. In a suspension cableway system, a pair of fixed cables, a car having a pair of grooved main pulleys at each end traveling on said cables, a vertically-movable grooved pulley located beneath each of said main pulleys and adapted to engage the cable, means tending to move the vertically-movable pulleys against the main pulleys, and additional means for clamping the cable between the pulleys.

4. A support for suspended cableway systems comprising a central member, and a pair of sleeve members each adapted to receive the cable and having a flexible connection with the central member.

The foregoing specification signed at Turin, Kingdom of Italy, this 8th day of November, 1905.

HERMENEGILDO BOZZALLA.

In presence of—
GOTT. C. PIRONI,
FRANCENO SIMONI.